(No Model.) 2 Sheets—Sheet 1.
J. P. WALTER.
MACHINE FOR CUTTING WAGON FELLIES.
No. 523,389. Patented July 24, 1894.
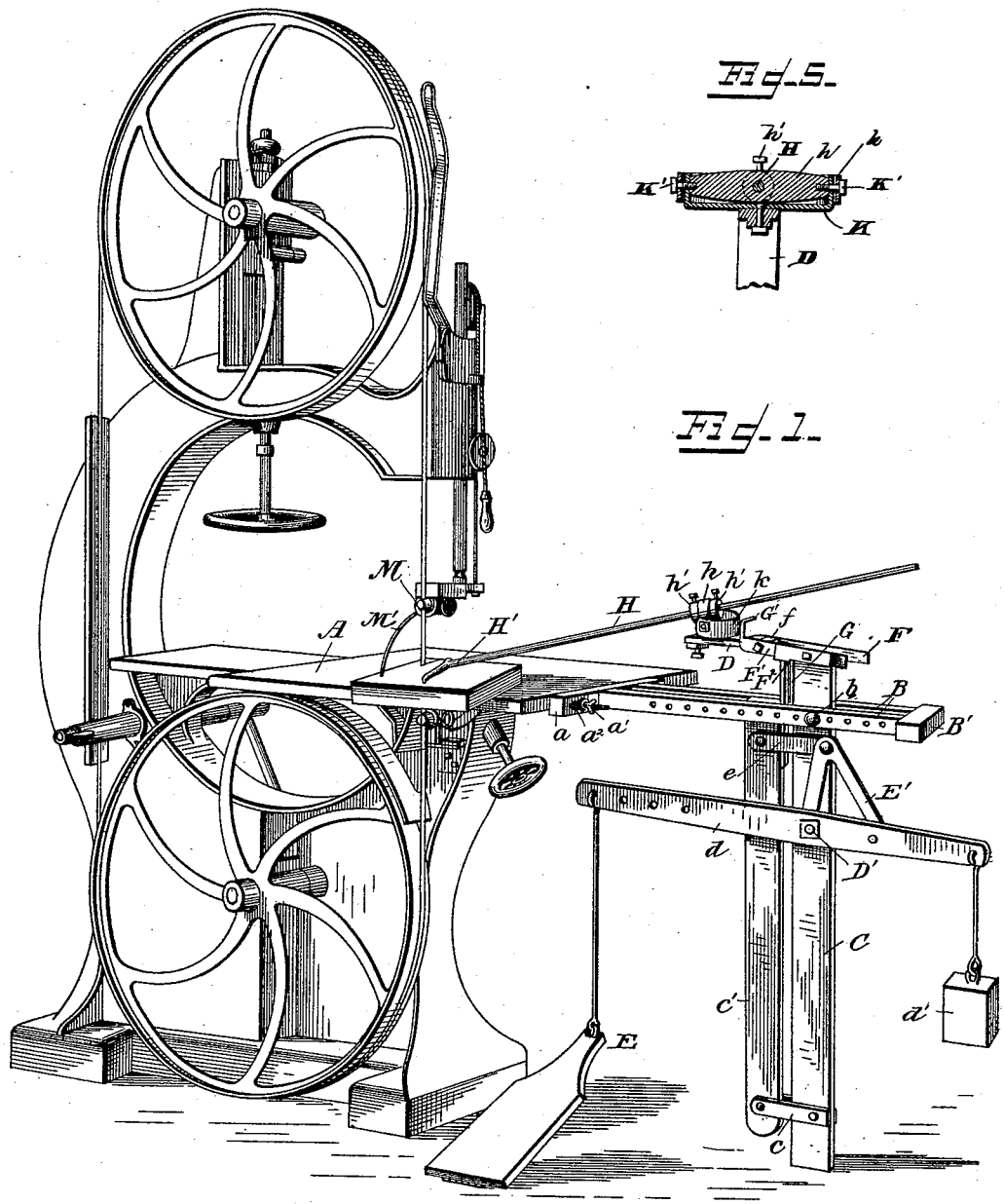
Witnesses
Chas H. Ourand
JB Owens
Inventor
John P. Walter
By his Attorneys,
C A Snow & Co.

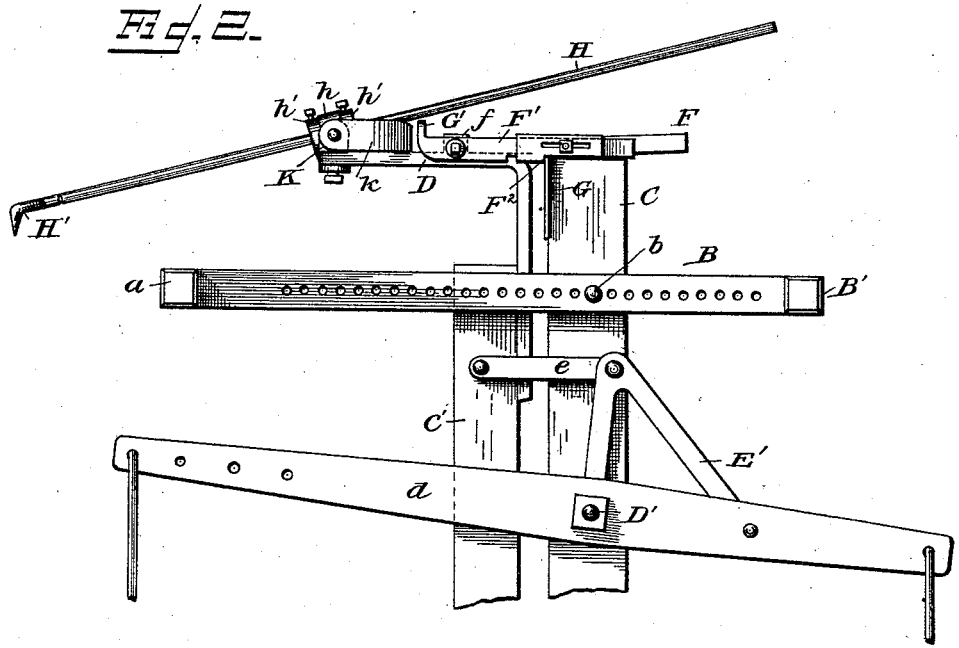
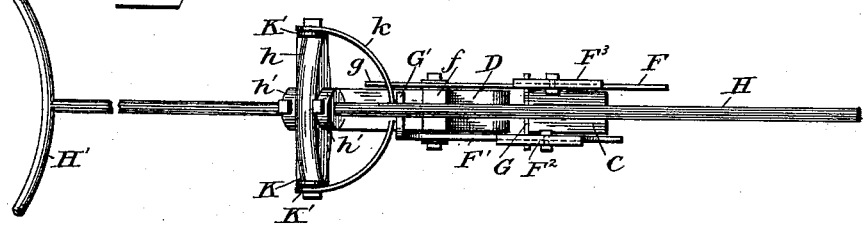
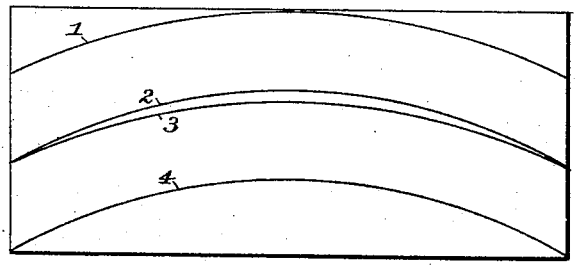

UNITED STATES PATENT OFFICE.

JOHN P. WALTER, OF EDGERTON, OHIO, ASSIGNOR TO GEORGE W. SQUIRES AND MOSES BRASHAW, OF SAME PLACE.

MACHINE FOR CUTTING WAGON-FELLIES.

SPECIFICATION forming part of Letters Patent No. 523,389, dated July 24, 1894.

Application filed March 7, 1894. Serial No. 502,718. (No model.)

*To all whom it may concern:*

Be it known that I, JOHN P. WALTER, a citizen of the United States, residing at Edgerton, in the county of Williams and State of Ohio, have invented a new and useful Machine for Cutting Wagon-Fellies, of which the following is a specification.

My invention relates to an improved machine for cutting wagon fellies and it consists principally in an attachment by which the material may be moved in the proper arc more accurately and conveniently; and my object is to construct a more durable and cheap device and one which may be readily attached to a band saw machine.

With these several ends in view, the invention consists of certain peculiar features of construction and combination of parts which I will now describe in detail and finally embody in the claims.

Referring to the accompanying drawings which illustrate my invention in operation: Figure 1 represents a perspective view of a band sawing machine having my attachment applied to the machine and shown in operation. Fig. 2 is a side elevation of the attachment showing its mode of operation. Fig. 3 is an enlarged detail showing the arrangement of the dog. Fig. 4 is a diagrammatical view showing the mode of operating on the timber; Fig. 5 a cross section taken through the mechanism for mounting the dog bar.

The reference letter A indicates the table of a band saw machine which may be of the usual or any preferred construction.

My attachment consists of a transverse bar $a$ secured to the edge of the table A by means of a bolt $a'$ and slot $a^2$. By this construction, the lateral disposition of the attachment may be adjusted to suit the exigencies of the occasion. Rigidly secured to the bar $a$ and projecting outwardly therefrom are two parallel bars B which extend for a suitable distance and are connected at their ends by a cross-bar B'. These bars are provided throughout their length with a series of transverse openings or notches, the function of which will be explained later. Secured between the bars B by means of a pin $b$ extending through the notches in the bars B is a vertical beam C which extends downwardly to a point near the ground.

Secured to the beam C at a point near its lower end and projecting inwardly therefrom are two lugs or projections $c$ which extend parallel to each other and which have journaled between them the oscillating bar $c'$. This bar $c'$ extends upwardly and normally parallel with the bar C until the bars B are reached. Secured to the upper end of this bar $c'$ is the angular frame D which extends upwardly above the bars B and then inwardly at right angles to the first portion for a distance equal to about one-fourth the length of the bars B, thus making room for the timber being operated upon.

Pivoted at the point D' to the bar C is a lever $d$ which extends horizontally and which has its outer end provided with a counterbalancing weight $d'$, while its inner end is connected to the treadle E. Connected to the lever $d$ and rigidly secured thereto is the upwardly extending frame E' which is formed after the manner of an inverted V and which has its upper end pivotally connected to the horizontally extending link $e$. The inner end of the link $e$ is in turn pivotally connected to the vertical bar $c'$ and at a point just below the bars B. By this construction it will be possible, upon oscillating the lever $d$, to swing the bar $c'$ on its pivot and forwardly carrying with it the frame D and its attachments. These attachments consist of the locking devices or links F and F', and the dog bar H. The locking devices F and F' consist of two links pivoted at their inner ends to the block $f$ which is in turn secured to the horizontal portion of the frame D. These links are provided with the notched plates $F^2$ and $F^3$. One plate for each link and the notches of these plates are adapted to engage the abrupt shoulder G secured to the upper end of the rigid post C. By this means the bar $c'$ may be locked at the desired position when the plates $F^2$ and $F^3$ are arranged at different points on their respective links. The link F' has formed on its inner extremity and just to the left of its pivot a laterally extending stud G' which extends just above the horizontal portion of the frame D, and which is arranged to engage the said portion of the frame when the link is raised. By this means the upper movement of the link is limited, thus preventing it from being so far upward that it will interfere with the operation of the guiding dog mechanism. On the other hand, the link F has an inwardly extending projection g which operates in the same connection as does the stud G' and which is adapted to engage the lower portion of the guiding dog mechanism thus preventing the link from falling below its proper position.

H represents the dog bar which consists of a bar of iron provided at its inner end with an arm H' extending at right angles to the main portion and having its ends turned downwardly and formed into points or dogs proper. These points are adapted to engage the work as shown in Fig. 1.

The main portion of the dog of the bar H is passed through a transversely extending block h and is capable of easy movement therein. Adjusting collars h' are provided for the bar H, and by these means the bar may be secured at any point along its length. The block h is mounted upon the U-shaped metallic frame K and provided with a pivotal connection K'. By this means the block and the attached bar H may be rocked on a horizontal axis. The frame K is in turn pivoted on a vertical axis at the forward end of the frame D, thus establishing a universal joint or connection for the bar H.

Pivotally connected to the pivots of the block h and extending rearward therefrom is the semi-circular, metallic band k which extends just below the rear end of the bar H and normally rests upon the frame D. The function of this strip is to limit the upward movement of the inner end of the bar H, and this is done when the bar is moved upwardly which will throw the strip into engagement with the frame D and prevent further movement. An additional function of this strip or band k is to raise the link F, by engaging the stud on its forward end and consequently rocking the link on its pivot. This will disengage the link from the shoulder with which it is arranged to operate. A further function of the stud G' is to disengage the link with the shoulder on the bar C, and this is effected when the bar H is raised. The bar when so operated will engage the stud and cause the link to swing on its axis raising its outer end and consequently disengaging it and the shoulder. Thus when the bar H has been used and is raised from the work, its lower end will engage the stud G' and consequently disengage the link to which it is attached and the shoulder on the bar C. This will be followed by a return of the bar c' owing to the operation of the weight d'. The strip or band K is also moved downwardly by the raising of the bar H, and owing to the engagement of this strip with the stud on the link F, this link will be also disengaged from the shoulder of the standard or post C.

Secured to the guide M of the band saw frame is the pointer M' which is formed of a piece of stout wire, bent forwardly and downwardly so as to point to the exact point on the timber where the saw will pass. By this means the operator can see just where the saw will pass and adjust the timber without having to first mark it.

To use my machine a block or plank of timber is placed on the saw table, and with its right hand edge adjacent to the saw, while its front edge is brought as near the pointer M' as possible. Thus the fellies may be sawed out, with the use of as little timber as possible. The bar H is then adjusted (the frame c' being in its normal position), so that its arm H' will swing in the arc of a circle which will be the same as the arc of the felly, and the points on said arm, H', made to engage the block so that it will be fixed thereto. By means of the collars on bar H, it may be adjusted as just described.

The machine is now in position to make the first cut, or that indicated by the numeral 1 of Fig. 4. This completed, the cut 2 is next in order, and by operating the treadle E, to throw frame c' forward the bar H and the block attached thereto will be advanced accordingly, thus placing the saw at a point near the middle of the plank and in position to cut out the imaginary line 2. When this has been done, one felly section will have been formed. If the block is large enough to permit the production of more than one felly from it, (as it is shown to be in the drawings,) the bar H may be raised and this will be followed, as before explained, by an operation of links F and F' and a consequent return of frame c', thus placing it in the normal position, and ready for a second operation, which will, of course, be a repetition of the first.

Thus it will be seen, that by means of my invention fellies may be cut out of blocks of wood without having to mark out the patterns as heretofore, and by a little practice the use of the appliance may become so easy to a mechanic that a great deal more work can be turned out than before. It is understood that the distance which the frame c' moves, forward and back, is equal to the vertical thickness of felly, and that this may be regulated to suit the thickness which it is desired to give the felly.

Having thus described my invention, what I claim as new, and desire to secure by Letters Patent, is—

1. The combination with a sawing machine of a horizontally extending frame secured thereto, an oscillating bar pivoted in said frame, treadle mechanism by which said bar may be oscillated, and a guide bar adjustably pivoted to the upper end of the said oscillating bar and provided at one end with a spur or dog adapted to project over the machine table and to engage the work being operated upon, the end of said bar being capable of moving in the arc of a circle whereby the work may be twice moved toward the saw in a similar line, substantially as described.

2. The combination with a sawing machine of a frame secured thereto and projecting horizontally therefrom, an oscillating bar pivoted to said frame, a lever operated by treadle mechanism and in connection with the oscillating bar whereby said bar may be operated, a dog bar pivoted to the upper end of the oscillating bar and provided with means whereby it can be adjusted to the bar at various points along its length, one end of said dog bar being provided with a spur or dog adapted to engage the work and capable of moving in the arc of a circle whereby the work may be twice moved toward the saw and in the arc of a circle, substantially as described.

3. The combination with a sawing machine of a laterally extending frame rigidly secured thereto and projecting upwardly therefrom, an oscillating bar pivoted in the frame, a lever pivoted to the frame and in link connection with the oscillating bar, a counterbalancing weight for holding the oscillating bar in a vertical position, treadle mechanism whereby the lever may be oscillated against the tendency of the counterbalancing weight and the oscillating bar moved forwardly, a dog bar pivoted to the upper end of the oscillating bar and provided with a universal connection whereby it may be moved in various directions and whereby it may be adjusted to the bar at any point along its length, a spur or dog on one end of the bar and projecting over the machine table and adapted to engage with the work, whereby the work may be moved toward the saw in the arc of a circle, substantially as described.

4. The combination with a sawing machine of a frame secured thereto and extending outwardly therefrom, an oscillating bar pivoted in said frame, and provided with mechanism whereby it may be oscillated, a dog bar pivotally connected to the upper end of said oscillating bar and capable of swinging thereon in the arc of a circle, one end of said dog bar being arranged to project over the machine table and provided with a spur or dog adapted to engage the work, and a link connected to the upper end of the oscillating bar and projecting rearwardly therefrom, the said link having formed therein a notch adapted to engage with a rigid shoulder on a frame, whereby when the oscillating bar is moved forward the link will hold it in such position, substantially as described.

5. The combination with a sawing machine of a frame secured thereto and extending outwardly therefrom, an oscillating bar pivoted in said frame, mechanism by which said bar may be oscillated, a dog bar pivotally connected to the upper end of the oscillating bar and having one end projecting over the machine table, a spur or dog connected to said end and adapted to engage the work, and a link pivoted to the upper end of the oscillating bar and projecting rearwardly therefrom, the link having formed thereon a spur and a notch, the notch being adapted to engage a rigid shoulder on the frame and thereby hold the oscillating bar forward, and the spur being adapted to be engaged by the dog bar when released from the work whereby the link is raised and its notch disengaged from the shoulder, substantially as described.

In testimony that I claim the foregoing as my own I have hereto affixed my signature in the presence of two witnesses.

JOHN P. WALTER.

Witnesses:
D. G. MORTLAND,
A. D. AUSTIN.